United States Patent
Schmierer et al.

(10) Patent No.: US 9,216,690 B2
(45) Date of Patent: Dec. 22, 2015

(54) EXTERIOR REAR VIEW MIRROR

(75) Inventors: Arne Schmierer, Kirchheim (DE);
Raimund Negel, Unterensingen (DE);
Andreas Herrmann, Winnenden-Baach (DE); Istvan Szmolenszki, Schwaikheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 394 days.

(21) Appl. No.: 13/164,219

(22) Filed: Jun. 20, 2011

(65) Prior Publication Data
US 2011/0317445 A1 Dec. 29, 2011

(30) Foreign Application Priority Data

Jun. 28, 2010 (EP) .................................. 10167559

(51) Int. Cl.
*B60R 1/06* (2006.01)
*F21Y 101/02* (2006.01)
*B60Q 1/26* (2006.01)
*B60Q 1/34* (2006.01)

(52) U.S. Cl.
CPC .................. B60R 1/06 (2013.01); *B60Q 1/2657* (2013.01); *B60Q 1/34* (2013.01); *F21Y 2101/02* (2013.01)

(58) Field of Classification Search
CPC .......... B60Q 1/34; B60Q 1/2657; B60Q 1/26; B60Q 1/2665; B60Q 1/56; B60Q 3/023; B60R 1/1207; F21Y 2101/02; F21S 48/1208; F21S 48/255
USPC .................................. 362/540, 494, 498, 546
See application file for complete search history.

(56) References Cited

U.S. PATENT DOCUMENTS

| 5,245,480 | A | | 9/1993 | Polzer |
| 6,099,156 | A | * | 8/2000 | Jenkins et al. ................ 362/511 |
| 6,347,872 | B1 | * | 2/2002 | Brechbill et al. ............. 359/879 |
| 6,712,329 | B2 | * | 3/2004 | Ishigami et al. ........... 248/475.1 |
| 7,033,033 | B2 | | 4/2006 | Ishigami |
| 7,448,589 | B2 | | 11/2008 | Blakeman et al. |
| 8,016,437 | B2 | * | 9/2011 | Wakabayashi ................ 359/871 |
| 8,514,064 | B2 | * | 8/2013 | Fukasawa et al. ............ 340/465 |

FOREIGN PATENT DOCUMENTS

| EP | 1243471 | 9/2002 |
| WO | 01/28814 | 4/2001 |
| WO | 2004/113124 | 12/2004 |

OTHER PUBLICATIONS

European Search Report for application No. EP 10 16 7559 dated Sep. 28, 2010.

* cited by examiner

*Primary Examiner* — Jong-Suk (James) Lee
*Assistant Examiner* — Mark Tsidulko
(74) *Attorney, Agent, or Firm* — Reising Ethington PC (57) ABSTRACT

An exterior rear view mirror, for a motor vehicle, with an exterior rear view mirror housing formed in at least two parts, which comprises an opening for a mirror glass, and houses at least one base bracket, on which the mirror glass is adjustably arranged. The exterior rear view mirror housing consists at least of a first housing part and a second housing part, which are connected to both each other as well as to the base bracket, in each case. Locking connections are provided at least between the first housing part and the second housing part, as well as between the housing parts and the base bracket, in each case.

4 Claims, 5 Drawing Sheets

EXTERIOR REAR VIEW MIRROR

The invention is based on a priority patent application EP 10167559.3 which is hereby incorporated by reference.

BACKGROUND ART

1. Field of the Invention

The invention relates to an exterior rear view mirror for a motor vehicle with an exterior rear view mirror housing formed in at least two parts, which comprises an opening for a mirror glass, and houses at least one base bracket, on which the mirror glass is adjustably arranged, whereby the exterior rear view mirror housing consists at least of a first housing part and a second housing part, which are connected to each other, as well as to the base bracket in each case, wherein locking connections at least both between the first housing part and the second housing part, as well as between the housing parts and the base bracket, in each case, whereby at least all connection points between the housing parts, as well as also between the housing parts and the base bracket in each case, include at least one locking connection.

2. Description of the Related Art

An exterior rear view mirror assembly for a motor vehicle consists, for example, of a mirror base attached to the motor vehicle, which can be covered by a mirror base covering, and an exterior rear view mirror arranged on the mirror base. The mirror base can be produced, for example, from a die casting material resistant to the forces and moments which occur. The exterior rear view mirror includes an exterior rear view mirror housing, which, among others, houses the base bracket assigned to the mirror base.

The mirror base and the base bracket are hinged together, so that the exterior rear view mirror can be pivoted about a hinge axis towards the mirror base from an operating position to a folding point and vice versa. In this process, bearing means can be provided between the mirror base and the base bracket, in order to keep wear and tear and frictional forces arising during movement as low as possible.

Preferably, the base bracket is also produced from die-casting material which is resistant to the occurring forces and moments, for example, from the same material as the mirror base. An adjusting device for a mirror glass, driven by an electric motor, for example, is arranged on the mirror base. The adjusting device acts on a backing plate, on which the mirror glass is arranged. The mirror glass can be mounted onto the backing plate by means of an adhesive connection, for example. The backing plate can be guided to and/or mounted on the adjustment device and/or the base bracket. The term 'backing plate' here refers to a bracket, which comprises at least one bracket surface, with a plane or vaulted design, closed or in a non-continuous grid, for example, honeycombed, on which it is suitable to attach a mirror glass, for example by means of an adhesive connection or by clipping e.g. locking means, protruding behind the perimeter of the bracket surface and arcing inwards towards the centre of the bracket surface, seen from the perimeter.

On its rear side, facing away from the direction of movement of the motor vehicle in the operating position, the exterior rear view mirror housing comprises an opening, through which the mirror glass is visible, or in which the mirror glass is arranged. In order to ensure that the mirror glass is adjustable, a distance is kept on all sides between the mirror glass or backing plate and the walls of the exterior rear view mirror housing surrounding the opening, so that a gap is given around the mirror glass between the walls of the exterior rear view mirror housing surrounding the opening.

Additionally, the exterior rear view mirror can comprise a turn signal indicator, a heatable mirror glass, an electrochromatically dimmable mirror glass, a recording and/or warning display module for a driving assistance device, such as blind spot monitoring, a lane departure warning, approach monitoring, or similar, or a combination thereof. Alternatively or additionally, the exterior rear view mirror can also comprise at least one sensor for recording driving and/or surrounding conditions, such as for example, temperature, brightness, degree of pollution, lighting situation, for example, in order to automatically heat the mirror glass, or to dim electrochromatically, for example.

For example, in order to simplify the assembly of the different components and component groups at least partly housed in the inside of the exterior rear view mirror housing, as well as, if necessary, their electrical connections between each other and/or to a control unit housed on the motor vehicle side, the exterior rear view mirror can be designed in at least two parts. A first housing part forms the housing base, for example, and a second housing part forms the housing cover. At the same time, one of both housing parts can include the housing section lying around the opening for the mirror glass, with the walls surrounding the opening.

An object in the development and production of motor vehicle parts, such as perhaps an exterior rear view mirror assembly or an exterior rear view mirror, is a simple, time-saving, and cost-effective production and assembly.

Exterior rear view mirrors with assembly concepts, which include time-consuming connection methods between individual components or component groups, are contrary to this objective.

An exterior rear view mirror of a motor vehicle is known in U.S. Pat. No. 7,448,589 B2. The exterior rear view mirror consists of a base bracket, a one-piece exterior rear view mirror housing fixed onto the base bracket with a rear-facing opening, a mirror glass inserted into the exterior rear view mirror housing through the opening, and an adjusting device connected to the base bracket and the mirror glass. At least one connection element connects the base bracket and the exterior rear view mirror housing in each case and/or the adjustment device and the base bracket in each case. The connection element consists of an elongated, ring-shaped constriction, which gradually tapers inwards towards a flanged piston, and a circular opening. The constriction has a smaller diameter to the piston. The diameter of the opening is smaller than the diameter of the piston and is of such dimensions that the constriction is adjustably held therein. The connection element forms a locking connection, which holds the exterior rear mirror housing or the adjusting device securely on the base bracket.

An object of the invention is to develop an exterior rear view mirror for a motor vehicle, which allows for a simple and cost-effective production and assembly.

SUMMARY OF THE INVENTION

The object is achieved by the features of an exterior rear view mirror, for a motor vehicle, with an exterior rear view mirror housing formed in at least two parts, which comprises an opening for a mirror glass, and houses at least one base bracket, on which the mirror glass is adjustably arranged, whereby the exterior rear view mirror housing consists at least of a first housing part and a second housing part, which are connected to each other, as well as to the base bracket in each case, wherein locking connections at least both between the first housing part and the second housing part, as well as between the housing parts and the base bracket, in each case, whereby at least all connection points between the housing parts, as well as also between the housing parts and the base bracket in each case, include at least one locking connection.

Accordingly, an exterior rear view mirror of a motor vehicle is provided with an exterior rear view mirror housing, which is formed in at least two parts. The exterior rear view mirror housing houses at least one base bracket, on which a mirror glass is arranged, for example, which is adjustable by an electric motor. On its rear side, the exterior rear view mirror housing comprises an opening for the mirror glass. The exterior rear view mirror housing consists at least of a first housing part and a second housing part, which are both connected to the base bracket. One of both housing parts can include a housing section lying around the opening for the mirror glass, with the walls surrounding the opening. The first housing part and the second housing part border each other along at least one joint.

The exterior rear view mirror includes locking connections at least both between the housing parts of the exterior rear view mirror housing, which is in at least two parts, as well as between the housing parts of the exterior rear view mirror housing, which is in at least two parts, and the base bracket. A locking connection, also denoted as a clip connection or a snap-in connection, includes corresponding locking elements, of which at least one is elastically deformable, and following a deformation, hooks detachably or inextricably with at least another to produce the locking connection. Examples of corresponding locking elements of this type are an elastically malleable locking means and a rearward engagement.

Among others, advantages of the invention in comparison to the prior art result from a simple assembly concept for the exterior rear view mirror, due to the locking connections created at least both between the housing parts as well as between the housing parts and the base bracket, which dispenses with time-consuming connection methods between the housing parts and the base bracket. A time-saving and cost-effective production of the exterior rear view mirror is thus facilitated.

It is particularly intended that at least all of the connection points between the housing parts of the exterior rear view mirror housing, which is in at least two parts, as well as between the housing parts and the base bracket, contain locking connections. A connection point is characterized in the process by a local connection between different components, over which local connection, forces can be transferred in at least two directions, as well as moments on at least two axes. A connection point is therefore not just formed by just a contact surface, such as, for example, a fold or an overlap on the joint between two housing parts, but rather for example, by a completely local form fit, which prevents relative movements between the housing parts or between the housing parts and the base bracket.

Preferably, the connection points between the housing parts, and between the housing parts and base bracket, are exclusively formed by locking connections.

It is possible, alternatively, that at least selected connection points containing the locking connections between the housing parts, and between the housing parts and the base bracket, comprise a further type of connection in addition to the locking connection. The further type of connection can be, for example, a bolted connection, a riveted joint, an adhesive joint, a welded joint etc, which, for example, can be easily and cost-effectively produced after production of the locking connection.

At least one locking connection can comprise at least one contact surface, whether it is, for example, in the form of a separation rib as an assembly aid, or as a locking element or as a slot for a locking means, or as a combination thereof. The contact surface cooperates in a self-aligning manner, for example, with a locking element or with another device of the locking connection or with a section of the components to be joined together. Assembly can be simplified by this cooperation in a self-aligning manner, in that after bringing into contact the corresponding, self-aligning contact surfaces, the components to be joined together can be brought together in the correct position and exact alignment pending production of the locking connection.

At least one contact surface can be provided on at least one of the adjacent components across from the joint, at least on one section of the joint between the housing parts and/or between one of the housing parts and base bracket. The contact surface can correspond to a surface, for example, of the adjacent components across from the joint. The contact surface can also be formed on a protruding separation rib. Alternatively or additionally, the contact surface can be formed on a projection or recess. The contact surface can serve to align the components, which are to be joined together, in relation to each other ahead of the locking of the locking connection, or to support the alignment of both components in relation to each other pending the locking connection, which therefore makes it simpler. The contact surface can also be formed as a simple projection or nose, in order to facilitate a pre-adjustment in assembly of the components. The contact surface arranged on a component can lie opposite a corresponding contact surface in line with the body stop on the adjacent component across from the joint, for example. The contact surface and the opposite-facing component and/or contact surface and opposite-facing contact surface can have a self-aligning form, so that during interlocking of several contact surfaces arranged along a joint, for example, the contact surfaces can be joined in a self-centering manner along the components bordering the joint, and/or if necessary, in a self-centering manner pending the locking of the locking connections between them.

The exterior rear view mirror can comprise a turn signal indicator. For this purpose, a turn signal indicator module can be at least partly housed in the exterior rear view mirror housing. The turn signal indicator module comprises at least one section, which includes at least one light-emitting surface provided for fulfilling the turn signal indicator function. The exterior rear view mirror housing can comprise at least one recess assigned to the at least one light-emitting surface, which is preferably completely taken by the light-emitting surface. The recess can at least be partly formed as an opening.

Preferably, the at least one section of the turn signal indicator module comprising the at least one light-emitting surface provided for fulfilling the turn signal indicator function extends at least between the first housing part and the second housing part of the exterior rear view mirror housing. The at least one section here borders along a respective portion on both of the at least two housing parts. The section borders the first housing part at least along at least a first portion and the second housing part along at least a second portion. It is possible that the housing parts are not directly connected to each other along these portions. However, in order to connect both housing parts with each other across the turn signal indicator module, at least along the first portion between the turn signal indicator module and the first housing part, at least one first connection point with at least a first type of connection is provided, and at least along the second portion between the turn signal indicator module and the second housing part, at least a second connection point with at least a second type of connection is provided, of which at least one type of connection includes a locking connection. The turn signal indicator module can be connected to a first housing part of both housing parts of the exterior rear view mirror housing by a detachable or inextricable locking connection, by a bolted connection or by a combination thereof. A second housing part can be connected along the portion bordering the turn signal indicator module by means of at least one locking connection to the turn signal indicator module.

Alternatively or additionally, both housing parts can be connected to each other along the portion across from the turn signal indicator module.

Alternatively, the turn signal indicator module can only border one housing part, for example, in that in one of the housing parts, a recess partly formed as an opening, for example, for a light-emitting surface of the turn signal indicator module, is provided.

The exterior rear view mirror housing can alternatively or additionally house a turn signal indicator module, a module and/or a sensor of a driving assistance device and/or a module and/or a sensor for control of a vehicle function, such as for example, for control of the heating and/or automatic dimming of the mirror glass. The module and/or sensor for a driving assistance device can be, for example, a display device for blind-spot monitoring, a lane departure warning or approach monitoring, a receiver for satellite-based position determination or similar, or a combination thereof. The module and/or sensor for control of a vehicle function can be, for example, a temperature sensor and/or a brightness sensor. The respective module or the respective sensor can be inserted into one of the slots arranged in both housing parts, and can be locked in place in the slot by means of a locking connection.

It is important to emphasise that the expressions first and second housing part, as well as the terms first and second in general, do not denote any order or concrete instructions for use, but simply serve for differentiation and are exchangeable in any way.

Further features of the invention result from the claims, description and drawings.

BRIEF DESCRIPTION OF THE DRAWINGS

Advantages of the invention will be readily appreciated as the same becomes better understood by reference to the following detailed description when considered in connection with the accompanying drawings, wherein.

Embodiments of the invention are subsequently explained in more detail by means of the drawings. Identical reference characters denote identical or identically acting elements. In the drawings, shown schematically.

DETAILED DESCRIPTION OF THE PREFERRED EMBODIMENT

The exterior rear view mirror 01 for a motor vehicle fully or partly shown in FIGS. 1 to 7, comprises an exterior rear view mirror housing 02 formed in at least two parts. The exterior rear view mirror housing 02 comprises an opening for a mirror glass on the rear side 52 running normally to the drawing layer, on the right in FIG. 1. The exterior rear view mirror housing 02 consists at least of a first housing part 03 and a second housing part 04. The first housing part 03 forms or contains a housing base, whereas the second housing part 04 forms or contains a housing cover. At the same time, one of both housing parts 03, 04 can include the housing section lying around the opening for the mirror glass, with the walls surrounding the opening.

Figure 1:
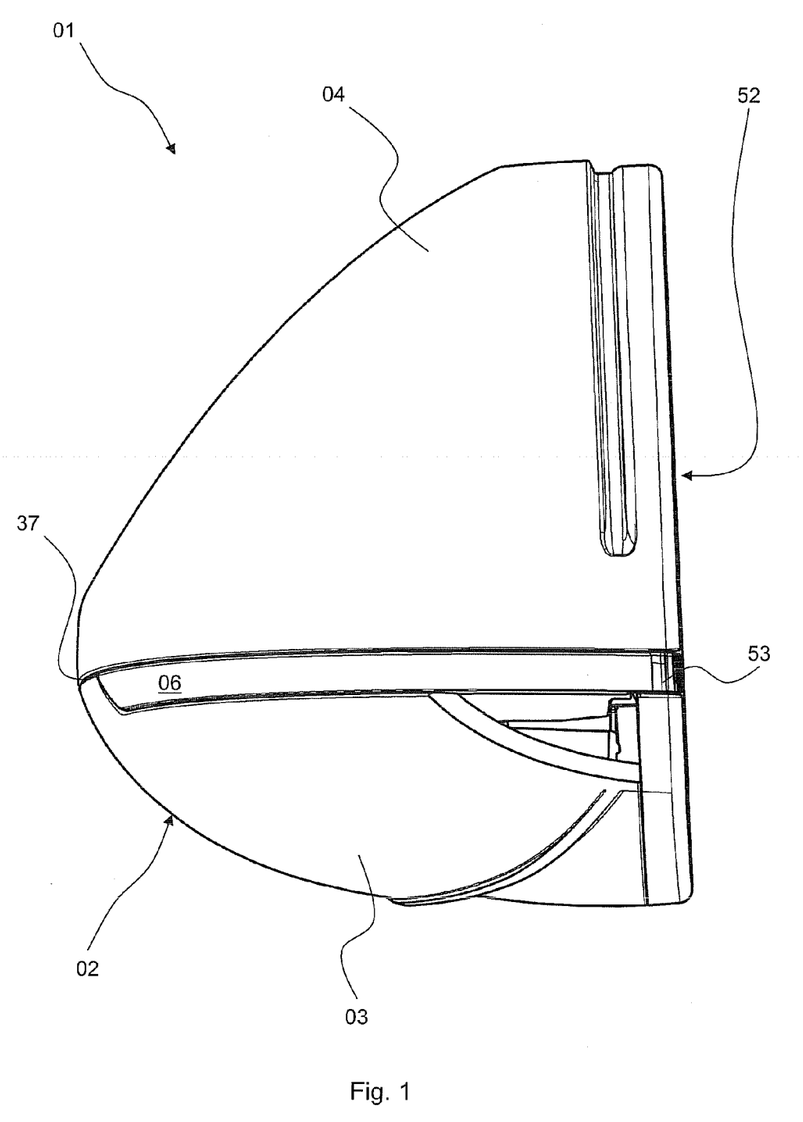
FIG. 1 is a side view of an exterior rear view mirror with an exterior rear view mirror housing, formed in at least two parts.
Figure 5:
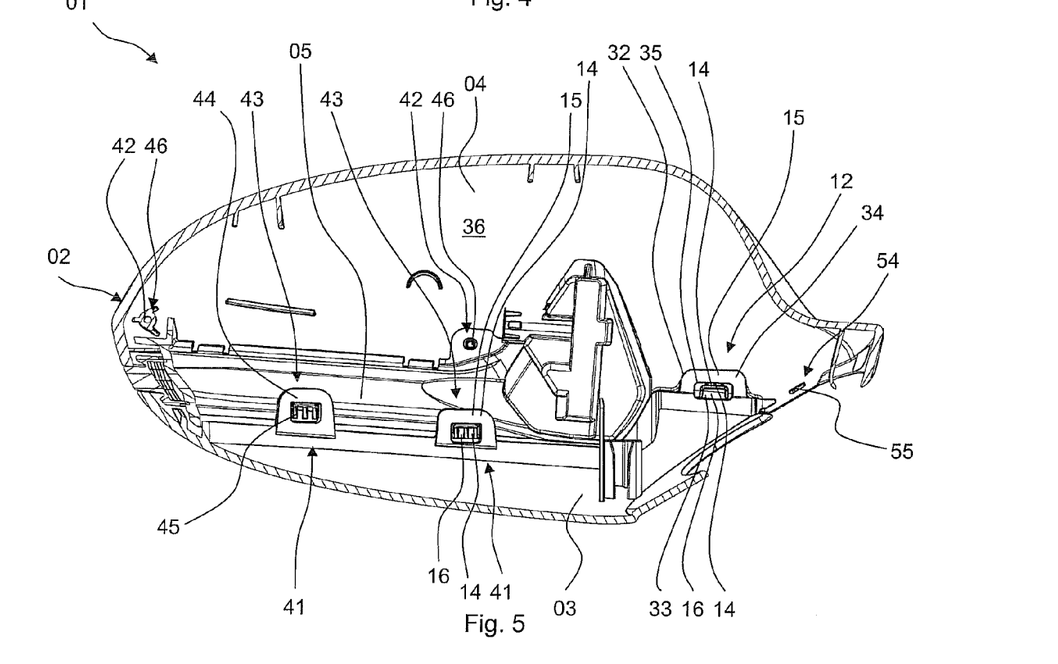
FIG. 5 is a partially cut view of an exterior rear view mirror with an exterior rear view mirror housing in at least two parts, and a turn signal indicator module at least partly housed therein.
Figure 6:
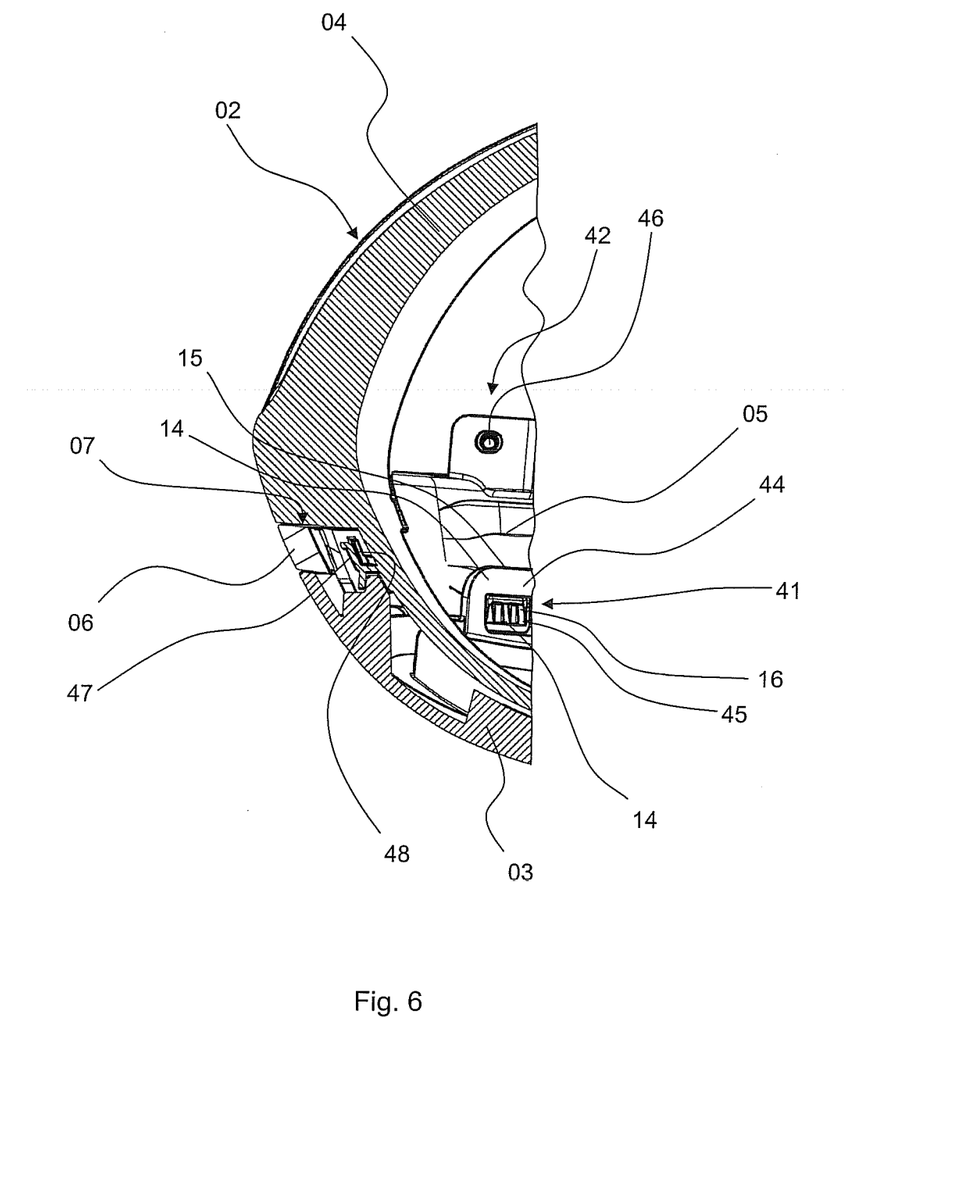
FIG. 6 is a detailed view of a section of a turn signal indicator module including a light-emitting surface between a first and a second housing part of an exterior rear view mirror housing, which is formed in at least two parts, of an exterior rear view mirror.

The exterior rear view mirror 01 shown in FIG. 1 can also comprise a turn signal indicator module 05 at least partly housed in the exterior rear view mirror housing 02 (FIG. 5; FIG. 6). The turn signal indicator module 05 contains at least one light-emitting surface 06 provided for fulfilling the turn signal indicator function. In order to house the light-emitting surface 06 so that it is outwardly visible, for example, level in the exterior rear view mirror housing 02, the exterior rear view mirror housing 02 can comprise at least one recess 07 assigned to the at least one light-emitting surface 06. In the process, the recess 07 preferably corresponds with the contour of the light-emitting surface 06, in such a way that at least in an exterior view of the exterior rear view mirror 01, the recess 07 is completely taken by the light-emitting surface 06.

Figure 2:
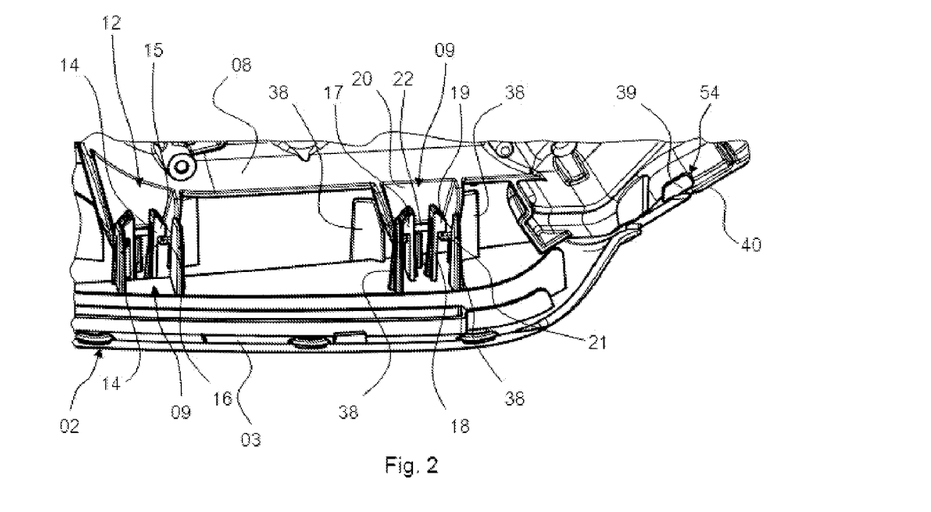
FIG. 2 is a detailed view of a locking connection between a first housing part of an exterior rear view mirror housing and a base bracket of an exterior rear view mirror housed therein, from a perspective view.
Figure 3:
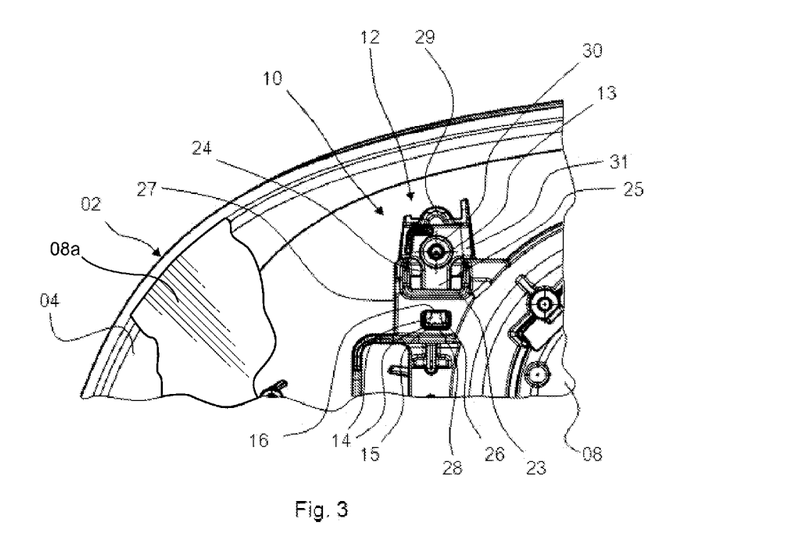
FIG. 3 is a detailed view of a locking connection between a second housing part of an exterior rear view mirror housing and a base bracket of an exterior rear view mirror housed therein, shown as a top view.
Figure 4:
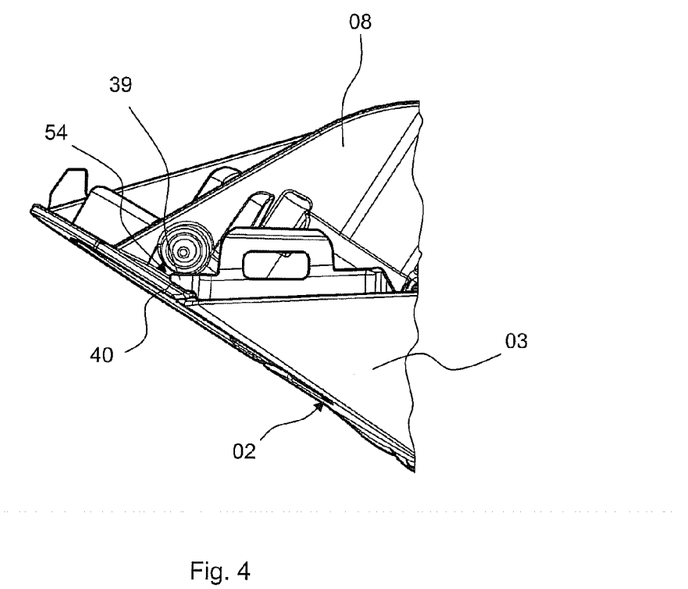
FIG. 4 is a detailed view of a first housing part of an exterior rear view mirror housing and a base bracket of an exterior rear view mirror housed therein, from a perspective view, whereby the first housing part is equipped with a separating rib for engaging the base bracket.

The exterior rear view mirror housing 02 houses at least one base bracket 08 (FIG. 2; FIG. 3; FIG. 4), on which a mirror glass 08*a* is adjustably arranged (shown in FIG. 3). A characteristic of the exterior rear view mirror 01 is that both at least the first housing part 03 and the second housing part 04 are connected to each other, and the first housing part 03 and the base bracket 08, as well as the second housing part 04 and the base bracket 08 are connected to each other in each case by means of locking connections 09, 10, 11.

In the process, preferably all of the connection points 12 between the first housing part 03 and the second housing part 04 include at least one locking connection 11, and all connection points 12 between the first housing part 03 and the base bracket 08 in each case include at least one locking connection 09, as well as all connection points 12 between the second housing part 04 and the base bracket 08 include in each case a locking connection 10.

In addition to the named locking connections 09, 10, 11 on the connection points 12 between the first housing part 03 and the second housing part 04, between the first housing part 03 and the base bracket 08, as well as between the second housing part 04 and the base bracket 08, additional locking connections can be provided on the connection points between other components and/or component groups of the exterior rear view mirror 01 and/or its exterior rear view mirror housing 02.

At least one connection point 12 between the first housing part 03 and the second housing part 04, or between the first housing part 03 and the base bracket 08, or between the second housing part 04 and the base bracket 08 can be produced exclusively by a locking connection 09, 11 (FIG. 2; FIG. 5).

Additionally, at least one selected connection point 12 between the first housing part 03 and the second housing part 04, or between the first housing part 03 and the base bracket 08, or between the second housing part 04 and the base bracket 08 can comprise a further type of connection in addition to the locking connection 10 (FIG. 3). For example, the further type of connection can be a bolted connection, shown in a simplified way by a screw hole 13 for acceptance of a fine thread screw or tapping screw, for example, with the bolted connection preferably being produced only after the locking connection 10, for the sake of simplicity.

The locking connections 09, 10, 11 can be made in different ways. The locking connections 09, 10, 11, which are also denoted as clip connections or snap connections, have corresponding locking elements 14 in common, of which at least one is elastically deformable, and following a deformation, hooks detachably or inextricably with at least another to produce the locking connection 09, 10, 11. Examples of corresponding locking elements 14 of this type are an elastically malleable locking means 15 and a rearward engagement 16.

The locking elements 14 arranged as locking means 15 in the locking connection 09 shown in FIG. 2 are in the form of back to back latches 17, which are arranged on the first housing part 03. These latches 17 consist in each case of a flexurally elastic locking spring 18 and a locking projection 19 protruding on one side on the free end of the locking spring 18. The side of the locking spring 18 facing away from the locking projection 19 forms the back of the latch 17. The locking elements 14 designed to for rearward engagement 16 are, in the locking connection 09, formed as a slot 20 arranged on the base bracket 08 with an edge 22 forming a recess 21. The recess 21 of the edge 22 thus forms the rearward engagement 16 for the locking projections 19 arranged on the locking springs 18.

In the locking connection 10 between the second housing part 04 and the base bracket 08, shown in FIG. 3, an accepting window 23 for a latch 24 arranged on the second housing part 04 is arranged on the base bracket 08. The latch 24, consisting of a flexurally elastic latching spring 25 and a locking projection 26 arranged on its free end, forms a locking element 14, made as locking means 15 of the locking connection 10. The accepting window 23 is surrounded by a frame 27, which comprises a latching recess 28 for the locking projection 26. The latching recess 28 forms a locking element 14, arranged as a rearward engagement 16 of the locking connection 10. On the frame 27 of the receiving window 23, an extension 29 is arranged, which can be provided with the screw hole 13 of the bolted connection. A screw opening 30, corresponding in its inner diameter with the outer diameter of a screw which can be pushed into the screw hole 13, is provided in a bracket 31 arranged on the second housing part 04. The latch 24 is arranged on the clamp 31. When the base bracket 08 and second housing part 04 are in an assembled state, the bracket 31 overlaps the extension 29 when a locking connection 10 is produced. The bracket 31 here surrounds an insertion opening for the extension 29. Inserting the screw into the screw opening 30 and screwing it into the screw hole 13 is thus only possible after production of the locking connection 10, and can serve, for example, for additional security of the connection point 12 including the locking connection 10.

The locking elements 14 of the locking connection 11, shown in FIG. 5, between the first housing part 03 and the second housing part 04 of the exterior rear view mirror housing 02 of the exterior rear view mirror 01 include locking means 15 arranged as a locking feature 32 and a rearward engagement 16 designed as a locking projection 33. The locking feature 32 is thus arranged on the first housing part 03, and the locking projection 33 is arranged on the second housing part 04. The locking feature 32 consists of a flexurally elastic frame 34, which surrounds a locking opening 35 for the locking projection 33.

At least one locking connection 09, 10, 11 acting between the first housing part 03 and the second housing part 04, or between the first housing part 03 and the base bracket 08, or between the second housing part 04 and the base bracket 08 can comprise at least one contact surface aligning the components or component groups, which are to be connected to each other, in relation to each other.

In the case of the locking connection 11 (FIG. 5), the contact surface can be the frame 34 of the locking feature 32, which reaches across in the interior space 36 of the exterior rear view mirror housing 02 via a joint 37 between the first housing part 03 and the second housing part 04, and leads to an edge, bordering the joint 37, of the second housing part 04 pending the locking connection 11 being snapped in.

In the case of the locking connection 09 (FIG. 2), the contact surface is formed, for example, by separating ribs 38 arranged on the first housing part 03, which are designed to taper towards each other conically, in order to supply the slot 20 of the base bracket 08 with self-aligning and self-centering back to back latches 17, pending snapping in of the locking connection 09 in assembly.

In the locking connection 10 (FIG. 3) the contact surface is formed by the bracket 31, which borders the insertion opening for the extension 29. During assembly, in insertion of the extension 29 into the insertion opening, the bracket 31 aligns the housing part 04 in relation to the base bracket 08 pending the locking connection 10 being snapped in.

Alternatively or additionally, at least one contact surface 54 can be provided on the first housing part 03 and/or on the second housing part 04 and/or on the base bracket, in order to align the components and/or component groups in relation to each other during assembly. The contact surface 54 cooperates with an adjacent housing part 03, 04 or the base bracket 08. The contact surface 54 can be formed by separating ribs 39, for example, arranged on the first housing part 03, shown in FIGS. 2 and 4, which cooperate with the protrusions 40 arranged on the base bracket 08. The contact surface 54 can alternatively or additionally comprise projections 55 provided on the second housing part 04 (FIG. 5). The alignment of the base bracket 08 and the first housing part 03, which results from the cooperation of the separating ribs 39 and protrusions 40, with the help of the contact surface 54, simplifies the production of the locking connection 09 between the first housing part 03 and the base bracket 08 by a preadjustment and simultaneous securing of a desired or required exact alignment and precise positioning of the base bracket 08 and first housing part 03 in relation to each other.

For example, the contact surface 54, which is formed by the separating ribs 39 and protrusions 40, forms a hinge, in a simplified way, between the first housing part 03 and the base bracket 08, about which the first housing part 03 and the base bracket 08 can be folded onto each other with simultaneous joining of the locking connection 09 between the first housing part 03 and the base bracket 08. The protrusion 55, which also forms a contact surface 54, supports the second housing part 04 on the base body 08, and thus ensures a precise alignment of the base bracket 08 and the second housing part 04 in relation to each other.

At least one section of the turn signal indicator module 05 formed at least by the light-emitting surface 06 extends at least between the first housing part 03 and the second housing part 04 of the exterior rear view mirror housing 02. At least one first connection point 41 with at least a first type of connection is situated between the turn signal indicator module 05 and the first housing part 03. At least one second connection point 42 with at least a second type of connection is situated between the turn signal indicator module 05 and the second housing part 04. From the different types of connections, at least one type of connection includes a locking connection 43.

For example, the turn signal indicator module 05 is at least connected to the first housing part 03 by means of a locking connection 43. The locking connection 43 forms the first housing part. The locking connection 43 can also be formed between the first housing part 03 and the second housing part 04, similar to the locking connection 11. As corresponding locking elements 14, the locking connection 43 includes a locking feature 44, for example, as a locking means 15 and a locking projection 45 as a rearward engagement 16.

The second type of connection can concern, for example, a bolted connection shown in a simplified way by screw holes 46.

Corresponding slots 47 and separating ribs 48 can also be provided for alignment of the light-emitting surface 06 of the turn signal indicator module 05, for example, in relation to the second housing part 04 to be connected to the turn signal indicator module 05 by means of a bolted connection, for example. In the process, the slot 47, as shown in FIG. 6, is preferably arranged on the base of the recess 07 on the second housing part 04, and a separating rib 48 is provided on the turn signal indicator module 05. Due to the corresponding design, the recess 47 permits a hooking of the separating rib 48 with subsequent folding of the turn signal indicator module 05 onto the second housing part 04 from inside, whereby the second connection points 42 are simultaneously exactly aligned, and the end 53 of the light-emitting surface 06 radiating back towards the rear side 52 to fulfil legal requirements is exactly positioned on the second housing part 04 (FIG. 1).

Figure 7:
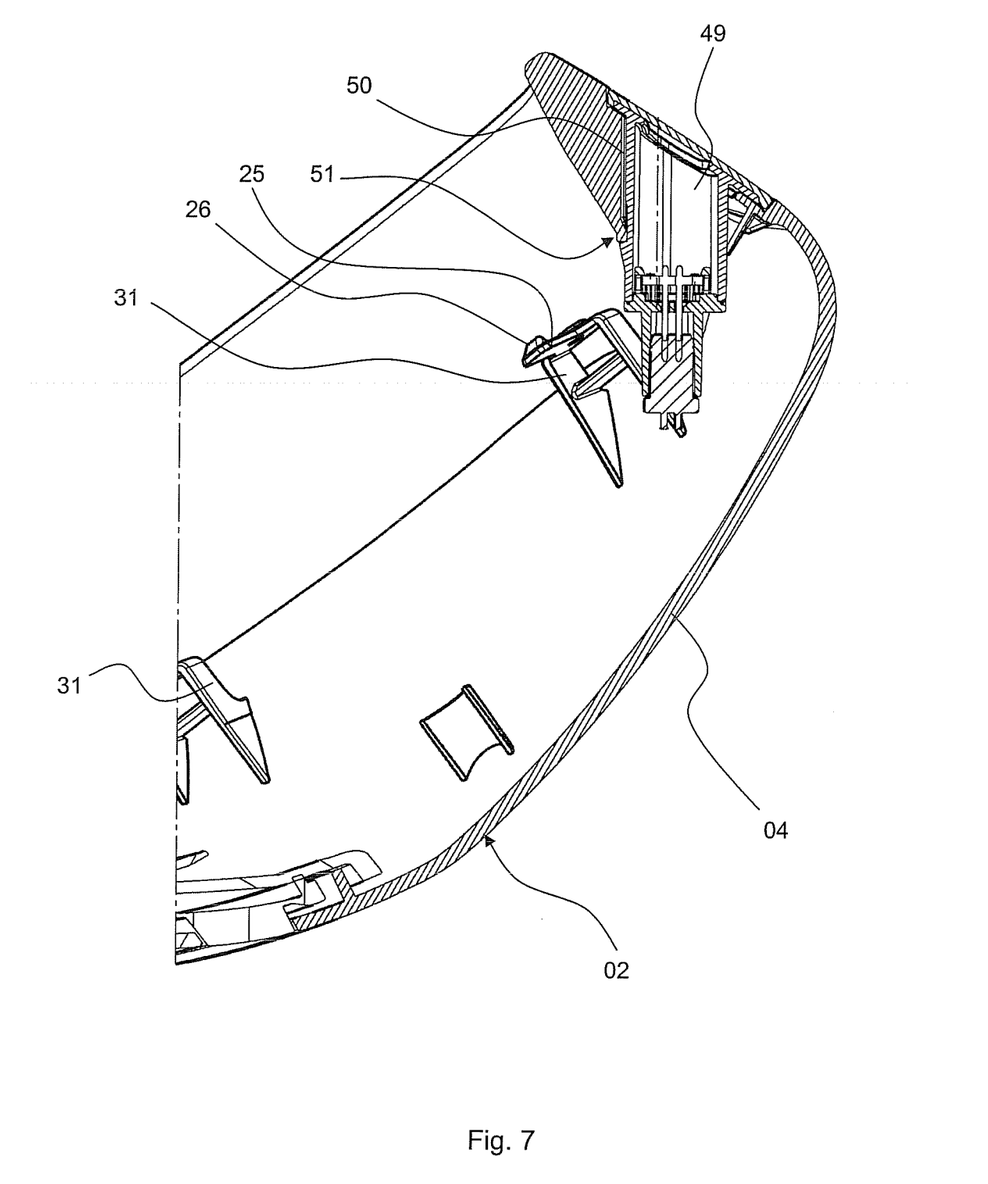
FIG. 7 is a partially cut view of an exterior rear view mirror with an exterior rear view mirror housing formed in at least two parts, and a display device at least partly housed therein.

Alternatively or additionally to the turn signal indicator module 05, the exterior rear view mirror housing 02 can comprise a module 49 of a driving assistance device (FIG. 7). The module 49 for a driving assistance device can be a display device for blind spot monitoring, for example, a so-called alert module. The module 49 can be inserted into one of the slots 50 arranged in the second housing part 04, and can be locked in place in the slot 50 by means of a locking connection 51.

The invention is particularly commercially applicable in the production of exterior rear view mirrors and exterior rear view mirror assemblies for motor vehicles.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

LIST OF REFERENCE CHARACTERS

01 Exterior rear view mirror
02 Exterior rear view mirror housing
03 First housing part
04 Second housing part
05 Turn signal indicator module
06 Light-emitting surface
07 Recess
08 Base bracket
09 Locking connection
10 Locking connection
11 Locking connection
12 Connection point
13 Screw hole
14 Locking element
15 Locking means
16 Rearward engagement
17 Latch
18 Locking spring
19 Locking projection
20 Slot
21 Recess
22 Edge
23 Accepting window
24 Latch
25 Locking spring
26 Locking projection
27 Frame
28 Latching recess
29 Extension
30 Screw opening
31 Bracket
32 Locking feature
33 Locking projection
34 Frame
35 Locking opening
36 Interior space
37 Joint
38 Separating rib
39 Separating rib
40 Projection
41 Connection point
42 Connection point
43 Locking connection
44 Locking feature
45 Locking projection
46 Screw hole
47 Slot
48 Separating rib
49 Module
50 Slot
51 Locking connection
52 Rear side
53 End
54 Contact surface
55 Projection

We claim:
1. An exterior rear view mirror for a motor vehicle comprising:
a base bracket secured to the motor vehicle and extending out therefrom;
an exterior rear view mirror housing accommodating said base bracket, wherein a mirror glass is adjustably arranged on said base bracket;
said exterior rear view mirror housing including first and second housing parts defining an opening for said mirror glass;

a turn signal module disposed between said first and second housing parts, said turn signal module performing a turn signal repeating function and includes at least one light exit surface;

a plurality of snap-in connections operatively connecting said first housing part to said second housing part and said turn signal module to said first and/or second housing parts, wherein a portion of said plurality of snap-in connections secure said exterior rear view mirror housing to said base bracket, wherein at least one of said first housing part and said second housing part is connected to said base bracket exclusively by a portion of said plurality of snap-in connections; and a plurality of slot and rib combinations with the slots extending out of one of the housing parts and the turn signal repeater module, and the ribs extending out of the other of the one of the housing parts and the turn signal repeater module, such that insertion of the ribs into the slots aligns the turn signal repeater module with respect to the one of the housing parts.

2. Exterior rear view mirror according to claim 1, characterized in that, at least one of said plurality of snap-in connections acting between the housing parts and/or between a housing part and the base bracket, comprises at least one contact surface aligning in relation to each other the housing parts to be connected to each other, and/or the housing part and the base bracket.

3. Exterior rear view mirror according to claim 1, characterized in that, at least one housing part and/or base bracket comprises at least one contact surface aligning the housing parts to be connected to each other, and/or a housing part and the base bracket, cooperating with an adjacent housing part or the base bracket.

4. Exterior rear view mirror according to claim 1, characterized in that, the first housing part or the second housing part includes the housing section lying around the opening for the mirror glass, with the walls surrounding the opening.

\* \* \* \* \*